(12) United States Patent
Wang

(10) Patent No.: US 11,500,869 B2
(45) Date of Patent: Nov. 15, 2022

(54) METHOD AND APPARATUS FOR OPTIMIZING DATABASE TRANSACTIONS

(71) Applicant: Alibaba Group Holding Limited, Grand Cayman (KY)

(72) Inventor: Jingyu Wang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 468 days.

(21) Appl. No.: 15/757,087

(22) PCT Filed: Aug. 30, 2016

(86) PCT No.: PCT/CN2016/097268
§ 371 (c)(1),
(2) Date: Mar. 2, 2018

(87) PCT Pub. No.: WO2017/041639
PCT Pub. Date: Mar. 16, 2017

(65) Prior Publication Data
US 2018/0181618 A1 Jun. 28, 2018

(30) Foreign Application Priority Data

Sep. 8, 2015 (CN) .......................... 201510563745.3

(51) Int. Cl.
G06F 16/2453 (2019.01)
(52) U.S. Cl.
CPC .. *G06F 16/24545* (2019.01); *G06F 16/24539* (2019.01); *G06F 16/24547* (2019.01)
(58) Field of Classification Search
CPC ......... G06F 16/24545; G06F 16/24539; G06F 16/24547; G06F 16/2315
See application file for complete search history.

(56) References Cited

U.S. PATENT DOCUMENTS 6,003,022 A 12/1999 Eberhard et al.
7,594,079 B2 9/2009 Yu et al.
(Continued)

FOREIGN PATENT DOCUMENTS

CN 101587447 A 11/2009
CN 101739298 A 6/2010
(Continued)

OTHER PUBLICATIONS

International Search Report to corresponding International Application No. PCT/CN2016/097268 dated Nov. 30, 2016 (2 pages).
(Continued)

*Primary Examiner* — William B Partridge
*Assistant Examiner* — Aryan D Toughiry
(74) *Attorney, Agent, or Firm* — James J. DeCarlo; Greenberg Traurig, LLP

(57) ABSTRACT

The disclosure provides a database operation method and apparatus. The method comprises: sequentially acquiring, during a process of executing a target transaction by an application server, database operation commands executed by the application server for the target transaction; executing a prediction algorithm on the database operation commands, returning predicted execution results to the application server so that the application server determines a next to-be-executed database operation command, and locally recording the database operation commands and predicted execution data generated from the executing of the prediction; and when acquiring a transaction commit command regarding the target transaction, controlling a database corresponding to the application server to actually execute the target transaction according to the locally recorded database operation commands and the predicted execution data. The disclosed embodiments improve transaction execution efficiency and increase transaction throughput.

18 Claims, 4 Drawing Sheets

(56) References Cited

U.S. PATENT DOCUMENTS

| | | | |
|---|---|---|---|
| 7,698,348 B2 | 4/2010 | Walker et al. | |
| 7,970,787 B2 | 6/2011 | Stuy et al. | |
| 8,131,894 B2 | 3/2012 | Cain, III et al. | |
| 8,468,151 B2 | 6/2013 | Branscome et al. | |
| 8,799,590 B2 | 8/2014 | Wang et al. | |
| 2004/0078559 A1* | 4/2004 | Katayama | G06F 9/3832 |
| | | | 712/239 |
| 2007/0198750 A1* | 8/2007 | Moilanen | G06F 9/5083 |
| | | | 710/6 |
| 2009/0187534 A1 | 7/2009 | Broll et al. | |
| 2009/0292884 A1 | 11/2009 | Wang et al. | |
| 2010/0138571 A1 | 6/2010 | Cain, III et al. | |
| 2012/0215751 A1* | 8/2012 | Broil | G06F 16/217 |
| | | | 707/703 |
| 2013/0132335 A1 | 5/2013 | Yang et al. | |
| 2013/0191105 A1* | 7/2013 | Abdirashid | G06F 11/3672 |
| | | | 703/21 |
| 2013/0275685 A1 | 10/2013 | Barbas et al. | |
| 2014/0214880 A1 | 7/2014 | Chi et al. | |
| 2014/0223418 A1* | 8/2014 | Michelsen | G06F 11/3668 |
| | | | 717/135 |
| 2014/0258223 A1 | 9/2014 | Minh et al. | |
| 2014/0304494 A1* | 10/2014 | Hawver | A63F 13/69 |
| | | | 713/1 |
| 2014/0351524 A1 | 11/2014 | Natarajan et al. | |
| 2015/0095313 A1 | 4/2015 | Hiraguchi et al. | |
| 2015/0378739 A1* | 12/2015 | Gschwind | G06F 9/3842 |
| | | | 712/225 |
| 2016/0070573 A1* | 3/2016 | Carlough | G06F 9/3001 |
| | | | 712/222 |
| 2017/0132002 A1 | 5/2017 | Busaba et al. | |
| 2017/0235580 A1 | 8/2017 | Knauth et al. | |
| 2017/0322809 A1* | 11/2017 | Gschwind | G06F 12/0842 |
| 2018/0307575 A1* | 10/2018 | Hanif | G06F 11/2294 |
| 2019/0042333 A1* | 2/2019 | Willhalm | G06F 12/0831 |

FOREIGN PATENT DOCUMENTS

| | | |
|---|---|---|
| CN | 103136308 A | 6/2013 |
| JP | H04245342 A | 9/1992 |
| JP | 2010066922 A | 3/2010 |
| JP | 2010198581 A | 9/2010 |
| JP | 2015072537 A | 4/2015 |
| JP | 2015520445 A | 7/2015 |

OTHER PUBLICATIONS

Notice of Reasons for Refusal to corresponding JP Application No. 2018-511371 dated Jun. 30, 2020 (4 pages).

* cited by examiner

METHOD AND APPARATUS FOR OPTIMIZING DATABASE TRANSACTIONS

CROSS-REFERENCE TO RELATED APPLICATIONS

The present application claims priority to Chinese Patent Application No. 201510563745.3, filed on Sep. 8, 2015 entitled "DATABASE OPERATION METHOD AND APPARATUS," and PCT Appl. No. PCT/CN16/97268 filed on Aug. 30, 2016 entitled "DATABASE OPERATION METHOD AND APPARATUS," both of which are incorporated herein by reference in their entirety.

BACKGROUND

Technical Field

The disclosed embodiments relate to the field of databases, and in particular, to the optimization of database transactions.

Description of the Related Art

A database "transaction" refers to a series of database operations performed as a single logical unit of work, either completely or not at all. A transaction is composed of a series of database operation commands, such as Structured Query Language (SQL) statements. These database operation commands have logics such as conditional statements and jumps. This means that during one execution, some database operation commands in the transaction may be skipped and may not be executed. However, in current systems, a database operation command that needs to be executed regarding a transaction cannot be acquired in advance. The database operation command can only be determined during execution according to the logic and statements of the transaction which are executed sequentially to perform the operation on the database. This technique of transaction execution is less efficient and the transaction throughput is relatively low.

SUMMARY

Various aspects of the disclosed embodiments provide database operation methods and apparatuses for improving transaction execution efficiency and increasing a transaction throughput.

One aspect of the disclosed embodiments provides a database operation method, comprising: sequentially acquiring, during a process of executing a target transaction by an application server, database operation commands executed by the application server for the target transaction; executing a prediction algorithm on the database operation commands, returning predicted execution results to the application server so that the application server determines a next to-be-executed database operation command, and locally recording the database operation commands and predicted execution data generated from the executing of the prediction; and when acquiring a transaction commit command regarding the target transaction, controlling a database corresponding to the application server to actually execute the target transaction according to the locally recorded database operation commands and the predicted execution data.

Another aspect of the disclosure provides a database operation apparatus, comprising: an acquiring module configured to sequentially acquire, during a process of executing a target transaction by an application server, database operation commands executed by the application server for the target transaction; a prediction execution module configured to execute a prediction algorithm on the database operation commands, return predicted execution results to the application server so that the application server determines a next to-be-executed database operation command, and locally record the database operation commands and predicted execution data generated from the executing of the prediction; and a control execution module configured to do the following: when acquire a transaction commit command regarding the target transaction, control a database corresponding to the application server to actually execute the target transaction according to the locally recorded database operation commands and the predicted execution data.

In the disclosure, a database operation apparatus works with an application server. When the application server executes a target transaction, a prediction execution process is added to acquire and record in advance all the database operation commands to be executed for the target transaction and predicted execution data, thereby providing conditions for an actual execution for a transaction; and then controlling, according to the recorded database operation commands and the predicted execution data, the database corresponding to the application server to actually perform an execution regarding the target transaction, which improves execution efficiency and further increases a transaction throughput.

BRIEF DESCRIPTION OF THE DRAWINGS

To illustrate the technical solutions in the disclosed embodiments more clearly, the drawings which are used in the description of the embodiments or current systems will be introduced briefly in the following description. The drawings described below are merely some embodiments of the disclosure, and those of ordinary skill in the art may still derive other drawings from these drawings without creative efforts.

DETAILED DESCRIPTION

In order to make the purposes, technical implementations, and advantages of the disclosed embodiments clearer, the technical implementations of the disclosed embodiments will be clearly and fully described below with reference to the drawings. The described embodiments are part of the embodiments rather than all the embodiments. Based on the illustrated embodiments, all other embodiments obtained by those skilled in the art without making creative efforts fall within the scope of the disclosure.

Figure 1:
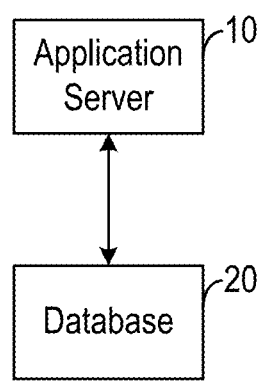
FIG. 1 is a block diagram of a database application system used by current systems.

FIG. 1 is a block diagram of a database application system used by current systems.

As shown in FIG. 1, a system includes an application server 10 and a database 20. The number of the database 20 may be one or more. Only one database 20 is used as an example in FIG. 1. When accessing the database 20 in a transactional manner, the application server 10 executes transaction logic to sequentially apply the database operation commands for the transaction on the database 20. Such a means of transaction execution is less efficient and the transaction throughput is relatively low.

Figure 2:
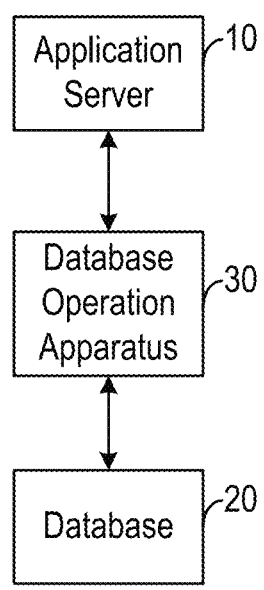
FIG. 2 is a block diagram of a database application system according to some embodiments of the disclosure.

In view of the defects in current systems, the disclosed embodiments provide a new database application system, as illustrated in FIG. 2.

The illustrated system adds a database operation apparatus 30 between the application server 10 and the database 20. The database operation apparatus 30 is configured to execute the database operation method provided herein to implement a new transaction execution logic. That is, executing a prediction algorithm on the transaction first to acquire, in advance, a database operation command that needs to be executed for the transaction; predicting an execution path; and then actually executing the transaction on the database 20 based on the database operation command and the predicted execution data acquired via the prediction execution. The method, as will be discussed, improves transaction execution efficiency and increases the transaction throughput. As used herein, the transaction throughput refers to the number of transaction processed per unit time.

It should be noted that the database operation apparatus 30 is actually a logic processing apparatus, which may be separately deployed between the application server 10 and the database 20. In some embodiments, the database operation apparatus 30 may be deployed at either the application server 10 or the database 20.

The following embodiments will specifically illustrate method flows for the technical solutions of the disclosed embodiments.

Figure 3:
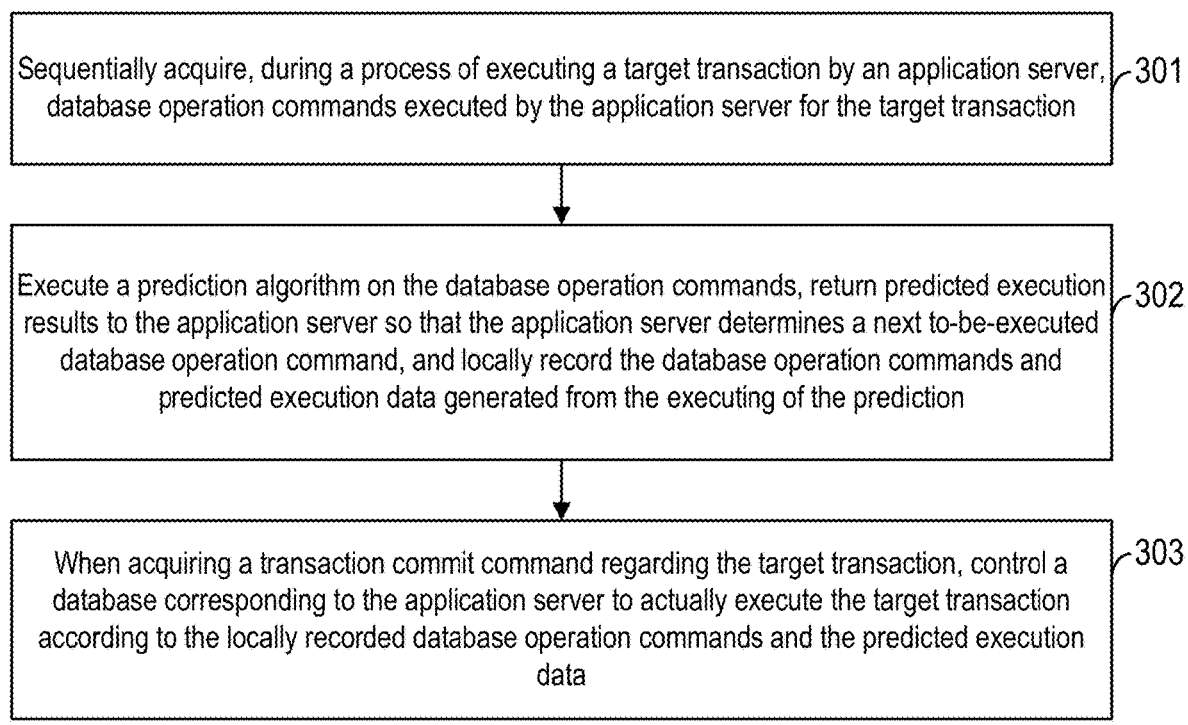
FIG. 3 is a flow diagram illustrating a database operation method according to some embodiments of the disclosure.

FIG. 3 is a flow diagram illustrating a database operation method according to some embodiments of the disclosure. As shown in FIG. 3, the method includes the following steps.

Step 301. Sequentially acquire, during a process of executing a target transaction by an application server, database operation commands executed by the application server for the target transaction.

Step 302. Execute a prediction algorithm on the database operation commands, return predicted execution results to the application server so that the application server determines a next to-be-executed database operation command, and locally record the database operation commands and predicted execution data generated from the executing of the prediction.

Step 303. When acquiring a transaction commit command regarding the target transaction, control a database corresponding to the application server to actually execute the target transaction according to the locally recorded database operation commands and the predicted execution data.

First, for the convenience of description, a transaction that needs to be executed by the application server is referred to as a target transaction in this embodiment. The target transaction includes operation commands for performing operations on the database and further includes, other than the database operation commands, some control commands for controlling the execution status regarding the target transaction, such as a transaction start command, a transaction commit command, and a transaction rollback command. These commands may be statements written in a database language. Depending on the database language, these commands can be written in different languages. For example, if a SQL is used, the above database operation commands and control commands are actually a series of SQL statements.

The application server controls the execution logic of the entire target transaction and the target transaction may be executed according to an existing method. The database operation apparatus sequentially acquires, during a process of executing a target transaction by an application server, database operation commands executed by the application server for the target transaction.

In one embodiment, an application server sends a database operation command to the database following the existing manner, so as to access the database. A database operation apparatus may monitor communication between the application server and the database, so as to intercept the database operation commands sent to the database by the application server.

In another embodiment, the processing logic of an application server is slightly modified and the logic of originally sending a database operation command to the database is changed to send the database operation command to a database operation apparatus. In this embodiment, the database operation apparatus may receive the database operation commands actively issued by the application server.

It should be noted that if a target transaction is an explicit transaction, a first command for the target transaction would be a transaction begin command, such as "begin transaction." In this example, before acquiring the database operation commands executed by the application server, the database operation apparatus may intercept the transaction begin command sent to the database by the application server for the target transaction. The database operation apparatus may then determine (according to the transaction begin command) that a target transaction needs to be executed. Alternatively, before acquiring the database operation commands executed by the application server, the database operation apparatus may receive the transaction begin command actively issued by the application server and determine, according to the transaction begin command, that a target transaction needs to be executed. If the target transaction is an implicit transaction, the first command of the target transaction would be the database operation command. In this case, the step of acquiring the transaction begin command is not included.

After acquiring the database operation commands executed by the application server, the database operation apparatus executes a prediction algorithm on the acquired database operation commands and returns predicted execution results to the application server, so that the application server can determine a next to-be-executed database operation command. The predicted execution results determine an execution path of the target transaction, and the execution path herein refers to a jump logic between database operation commands. By returning the predicted execution results to the application server, a purpose of controlling the execution logic of the entire target transaction by the application server is achieved.

In addition, the database operation apparatus further needs to locally record the acquired database operation commands and the predicted execution data generated via the execution of the prediction on the database operation commands. The predicted execution data mainly refers to some data in the process of executing a prediction algorithm on the database operation commands.

For example, the database operation apparatus may locally establish a memory bank, and store the acquired database operation commands and predicted execution data in the memory bank.

Operations performed on the database by the database operation commands are mainly accessing data in the database. A data environment for the database operation command may be simulated, and executing a prediction algorithm on the database operation commands based on the simulated data environment. On such basis, a method of executing a prediction algorithm on the database operation commands may include: simulating, in a locally established memory bank, a data environment required by the database operation commands, and executing a prediction algorithm on the database operation commands based on the simulated data environment.

Further, simulating, in a locally established memory bank, a data environment required by the database operation commands, and executing a prediction algorithm on the database operation commands based on the simulated data environment includes: splitting the acquired database operation commands into a read command and a write command; and running the read command on a real database. That is, executing the read command in the database to acquire a read data set (ReadSet), and storing the read data set into the local memory bank to simulate the data environment required by the database operation commands. Then, the method may apply the write command on the memory bank to enable the executing of the prediction on the database operation commands. That is, the method executes the write command in the memory bank to modify the read data set, such as updating or querying relevant data in the read data set. The executing write command to modify the read data set may generate a result data set (affectRowInMemdb); and the result data set includes a predicted execution result.

In the above process of executing the prediction algorithm, the database operation apparatus may locally record the read data set read by the read command and the result data set generated by executing the write command. In view of this, the predicted execution data may include a read data set and a result data set; or may include some data in a read data set and some data in a result data set, such as data that may generate beneficial effects for the actual target transaction in the database. Examples of such data include various indexes of some values such as first level indexes, second level indexes, or primary key values.

The database operation apparatus respectively executing the prediction algorithm on sequentially acquired database operation commands; acquires database operation commands and the corresponding predicted execution data; and stores the data operation commands and the corresponding predicted execution data in the memory bank.

When acquiring a transaction commit command for the target transaction (that is, the application server executes the transaction commit command), the database operation apparatus may control, according to the locally recorded database operation commands and the predicted execution data, a database corresponding to the application server to actually execute a target transaction.

In view of the above, a database operation apparatus works with an application server. When the application server performs an execution regarding a target transaction, a prediction execution process is added to acquire and record in advance all the database operation commands to be executed for the target transaction and predicted execution data, thereby providing conditions for an actual execution for a transaction. Then when the target transaction is actually executed according to the recorded database operation commands and the predicted execution data, relevant data information can be acquired in advance and jumps between commands may be reduced, thereby improving execution efficiency and increasing the transaction throughput.

An embodiment of controlling a database corresponding to the application server to actually execute the target transaction according to the locally recorded database operation commands and the predicted execution data includes:

issuing to the database, by an database operation apparatus, the locally recorded database operation commands to instruct the database to execute the locally recorded database operation commands; receiving actual execution results of the database operation commands returned by the database; then comparing the actual execution results of the database operation commands with predicted execution results. If the actual execution results are the same as the predicted execution results, issuing a transaction commit command to the database, so that the database commits a target transaction. If the actual execution results are different from the predicted execution results, issuing a transaction rollback command to the database, so that the database rolls back the target transaction.

In the above embodiment, atomicity of the transaction is considered via comparing the actual execution results with the predicted execution results. The error in the execution of the transaction may be avoided and the probability of a successful execution of the transaction may be improved.

Further, in current systems, since not all the database operation commands that need to be executed by the transaction can be known in advance. The database operation commands can only be executed sequentially according to execution logic of the transaction, which leads to frequent interaction between the application server and the database. In a scenario where the above is done remotely, a large amount of network resources will be consumed. However, in this embodiment, all the database operation commands that need to be executed by the target transaction are acquired in advance through a predicted execution process, i.e., locally recorded database operation commands. Therefore, the locally recorded database operation commands may be issued to the database simultaneously (or together) in the process of issuing the locally recorded database operation commands to the database to instruct the database to execute the locally recorded database operation commands, thereby saving network resources. In addition, for some parallel database operation commands, the database may perform parallel operations, thereby further improving the transaction execution efficiency.

Further, all the locally recorded database operation commands and the locally recorded predicted execution data can be issued together to the database.

Further, in an embodiment of controlling a database corresponding to the application server to actually execute the target transaction according to the database operation commands stored in the memory bank and the predicted execution data, the database operation apparatus may determine, according to the locally recorded database operation commands, whether the target transaction is a stand-alone transaction. If a determination result is positive, use a stand-alone transaction processing logic to control the database to actually execute the target transaction according to the locally recorded database operation commands and the predicted execution data. If the determination result is negative, use a distributed transaction processing logic to control the database to actually execute the target transaction according to the locally recorded database operation commands and the predicted execution data.

Whether the target transaction is a stand-alone transaction or a distributed transaction can be determined based on the database operation commands acquired in the prediction execution process. For example, it may be determined whether an object that the locally recorded database operation commands are applied on is the same physical device. If the determination result is positive, it may be determined that the target transaction is a stand-alone transaction. If the determination result is negative, it may be determined that the target transaction is a distributed transaction.

A processing logic of the distributed transaction is different from that of the stand-alone transaction. The processing logic of the stand-alone transaction is relatively simple, such as not involving issues such as read-write lock. The consumption of resources is therefore relatively small. On such basis, this embodiment determines if a target transaction is a stand-alone transaction and proceeds with the processing logic of the stand-alone transaction when it is determined that the target transaction is a stand-alone transaction, thereby improving the processing efficiency and saving the processing cost.

In an embodiment, if the database operation apparatus acquires a transaction rollback command for the target transaction (that is, when an application server executes the transaction rollback command), a local memory bank may be directly cleared to enable the rollback operation. In this case, since the target transaction is not really executed in the database, the database does not need to execute the rollback operation. In view of this, in this case, using the method of this embodiment may also improve the transaction execution efficiency.

An inventory reduction transaction is used as an example in the following description to describe in detail the work flow of the technical solution of the disclosed embodiments.

SQL codes of the inventory reduction transaction are as follows, and texts in brackets are notes:

```
begin transaction [begin a transaction]
  select * from inventory where itemId = ? for update; [using an item
id
                                                  to check a
                                                  current
                                                  inventory and
                                                  lock]
  if (item.inventory > 0)
    item.inventory--;
    update inventory set item.inventory =
      $item.inventory where itemId = ?;
    commit;
  else
    rollback; [if the current inventory is greater than 0, reduce and
              update the item inventory and commit; otherwise, roll
back]
```

During an actual execution process, the application server is responsible for an entire logic of the inventory reduction transaction; and the database operation apparatus (or may be referred to as an execution server) may only acquire the begin transaction executed by the application server, SQL statements needed to be executed, and commit/rollback commands.

First, after a transaction begins, the database operation apparatus establishes a memory bank locally.

When acquiring a SQL statement "select * from inventory where itemId=? for update", the database operation apparatus directly searches the SQL statement in the database, records a query result (that is, the queried to-be-processed data, the current inventory) in the local memory bank, and returns all the inquiry results to the application server.

It should be noted that since the SQL statement is a query statement, splitting the statement or not leads to the same results. To simplify the operation, the query statement may not need to be split.

After receiving the query result returned by the database operation apparatus, the application server determines whether the query result is greater than 0; if the determination result is positive, reduce the current inventory and execute to update the statement. That is, update inventory set item.inventory=$item.inventory where itemId=?; and if the determination result is negative, execute a rollback statement.

If the database operation apparatus receives the rollback statement, the local memory bank is cleared. In this case, since the transaction is not executed in the database, the database does not need to execute the rollback operation.

If the database operation apparatus receives the update statement, i.e., update inventory set item.inventory=? where itemId=?, the database operation apparatus splits the SQL statement into a read database command, i.e., select * from inventory where itemId=? and a write database command, i.e., update inventory set item.inventory=? where itemId=?; then, the apparatus sends the statement "select * from inventory where itemId=?" to the database to acquire a read data set; and writes data in the read data set into a local memory bank; and then performs an update operation in the local memory bank based on the statement "update inventory set item.inventory=? where itemId=?" so as to acquire a result data set and return an execution result for the result data set to the application server. The application server then executes a commit command. Data in the result data set and the read data set forms predicted execution data.

When acquiring the commit command, the database operation apparatus executes the inventory reduction transaction in the database based on the SQL statements and the predicted execution data stored in the memory bank. This time, the transaction execution process takes place for real.

Preferably, the database operation apparatus may commit all the SQL statements in the memory bank to the database at one time; and the database performs execution based on this, which saves network resources cost by transmitting SQL statements.

An execution result is also returned from this actual execution; and a predicted execution result may be compared with an actual execution result. If the comparison result is that the two results are the same, this transaction may be committed in the database. If the comparison result is that the two results are different, the commit is considered as a failure. Since in this case, the transaction is not actually executed and committed in the database, an entire request may be simply rolled back; and the application server will re-commit.

All the SQL statements that need to be executed, along with their corresponding predicted execution data, such as all slicing conditions and numerical indexes, have been acquired from the above prediction executions. These data are sufficient to determine in advance whether the transaction is a stand-alone transaction. Based on this, a corresponding transaction logic may be used, which helps to save resources.

It should be noted that in order to briefly describe each foregoing method embodiment, all the method embodiments are expressed as a combination of a series of actions. Those skilled in the art should know that the disclosure is not limited by the sequence of the described actions. Certain steps can be applied with different sequences or can be carried out at the same time according to the disclosed embodiments. Secondly, those skilled in the art should also know that all the embodiments described in the description belong to exemplary embodiments; the related actions and modules are not necessarily needed for the disclosure.

In the embodiments, the description of each embodiment has its own focus; and references for those that are not described in detail in a certain embodiment can be made by referring to the related descriptions of other embodiments.

Figure 4:
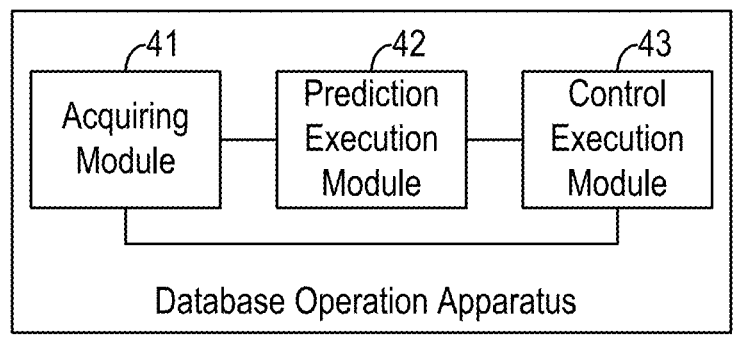
FIG. 4 is a functional block diagram of a database operation apparatus according to some embodiments of the disclosure

FIG. 4 is a functional block diagram of a database operation apparatus according to some embodiments of the disclosure. As shown in FIG. 4, the apparatus includes: an acquiring module 41, a prediction execution module 42, and a control execution module 43.

The acquiring module 41 is configured to sequentially acquire, during a process of executing a target transaction by an application server, database operation commands executed by the application server for the target transaction.

The prediction execution module 42 is configured to execute a prediction algorithm on the database operation commands, returning predicted execution results to the application server so that the application server determines a next to-be-executed database operation command, and locally recording the database operation commands and predicted execution data generated from the executing of the prediction.

The control execution module 43 is configured to do the following: when acquire a transaction commit command regarding the target transaction, control a database corresponding to the application server to actually execute the target transaction according to the database operation commands and the predicted execution data stored in the memory bank.

In an embodiment, the acquiring module 41 is specifically configured to intercept the database operation commands sent by the application server to the database; or receive the database operation commands actively issued by the application server.

In an embodiment, the acquiring module 41 is further configured to intercept a transaction begin command sent to the database by the application server for the target transaction before acquiring the database operation commands executed by the application server for the target transaction; or to receive a transaction begin command for the target transaction actively issued by the application server.

In an embodiment, the prediction execution module 42 is specifically configured to: simulate, in a locally established memory bank, a data environment required by the database operation commands, and execute a prediction algorithm on the database operation commands based on the simulated data environment.

Further, the prediction execution module 42 is specifically configured to: split the database operation commands into a read command and a write command; execute the read command in the database to acquire a read data set, and store the read data set into the memory bank to simulate the data environment for the database operation commands; and execute the write command in the memory bank to modify the read data set.

In an embodiment, the control execution module 43 is specifically configured to: issue to the database the locally recorded database operation commands to instruct the database to execute the database operation commands, and receive actual execution results of the database operation commands returned by the database; if the actual execution results are the same as the predicted execution results, issue the transaction commit commands to the database, so that the database commits the target transaction; and if the actual execution results are different from the predicted execution results, issue a transaction rollback command to the database, so that the database rolls back the target transaction.

The atomicity of the transaction is considered by having the control execution module 43 compares the actual execution results with the predicted execution results; the error in the execution of the transaction may be avoided and the probability of a successful execution of the transaction may be improved.

Further, the control execution module 43 is specifically configured to: simultaneously issue the locally recorded database operation commands to the database in the process of issuing the locally recorded database operation commands to the database to instruct the database to execute the locally recorded database operation commands, thereby saving network resources.

In an embodiment, the control execution module 43 is specifically configured to: determine, according to the locally recorded database operation commands, whether the target transaction is a stand-alone transaction; if a determination result is positive, use stand-alone transaction processing logic to control the database to actually execute the target transaction according to the locally recorded database operation commands and the predicted execution data; or if a determination result is negative, use distributed transaction processing logic to control the database to actually execute the target transaction according to the locally recorded database operation commands and the predicted execution data.

A processing logic of the distributed transaction is different from that of the stand-alone transaction. The processing logic of the stand-alone transaction is relatively simple, such as not involving issues such as read-write lock; the consumption of resources is therefore relatively small. On such basis, the control execution module 43 determines whether a target transaction is a stand-alone transaction and proceeds with the processing logic of the stand-alone transaction when it is determined that the target transaction is a stand-alone transaction, thereby improving the processing efficiency and saving the processing cost.

In an embodiment, the prediction execution module 42 is further configured to: delete the locally recorded database operation commands and the predicted execution data when a transaction rollback command regarding the target transaction is acquired, such as clear the memory bank.

The database operation apparatus provided in this embodiment may be separately deployed between the application server and the database; or it may be deployed at the application server, or at the database.

The database operation apparatus provided in this embodiment works with the application server. When the application server performs an execution regarding a target transaction, a prediction execution process is added. In the execution of the prediction, an execution path of the target transaction may be acquired in advance, i.e., a database operation command to be actually executed; and predicted execution data generated from the prediction execution is recorded, so as to provide conditions for the actual executing of the transaction. Then, when the target transaction is actually executed according to the recorded database operation commands and the predicted execution data, relevant data information may be obtained in advance based on the prediction execution data and jump between commands may be reduced, thereby improving the execution efficiency and increasing the transaction throughput.

Those skilled in the art can clearly understand that for a convenient and concise description, references of the specific working processes of the systems, the device, and the units described above can be made by referring to the corresponding processes in the foregoing method embodiments; they are not repeated herein.

In the several embodiments provided by the disclosure, it should be understood that the disclosed systems, apparatuses, and methods can be implemented in other ways. For example, the device embodiment described above is merely illustrative. For example, the division of the units is merely a logical function division; other division methods in practical implementation may exist, like a plurality of units or components can be combined or can be integrated into another system; or some features can be ignored or are not executed. Additionally, the intercoupling, direct coupling, or communication connection displayed or discussed may be electrical, mechanical or other forms through some interfaces, indirect coupling or communication connection of the device or the units.

The units described as separate parts may or may not be physically separated; and the parts shown as units may or may not be physical units, which may be located in one place or may be distributed onto a plurality of network units. The objective of the solution of this embodiment may be implemented by selecting a part of or all the units according to actual requirements.

In addition, various functional units in the disclosed embodiments may be integrated in one processing unit, or the units exist physically and separately, or two or more units are integrated in one unit. The integrated unit may be implemented by using hardware, and may also be implemented in a form of hardware plus a software functional unit.

The integrated unit implemented in the form of a software functional unit may be stored in a computer readable storage medium. The software functional unit is stored in a storage medium, and includes several instructions that enable a computer device (which may be a personal computer, a server, a network device or the like) or a processor to execute partial steps of the method in the disclosed embodiments. The foregoing storage medium includes various media capable of storing program code, including a USB flash disk, a mobile hard disk, a Read-Only Memory (ROM), a Random Access Memory (RAM), a magnetic disk, an optical disc, or the like.

It should be finally noted that the above embodiments are merely used for illustrating rather than limiting the technical solutions of the disclosure. Although the disclosed embodiments are described in detail with reference to the foregoing embodiments, those of ordinary skill in the art should understand that the technical solutions recorded in the foregoing embodiments may still be modified or equivalent replacement may be made on partial technical features therein. These modifications or replacements will not make the essence of the corresponding technical solutions be departed from the spirit and scope of the technical solutions in the embodiments of the disclosure.

What is claimed is:

1. A method comprising:
   intercepting, by a server, database operation commands associated with a transaction executed by an application server;
   splitting, by the server, the database operation commands into a set of read commands and a set of write commands;
   populating, by the server, a data environment required for the database operation commands in a local memory bank by reading a portion of a database into the local memory bank, the portion identified based on the set of read commands included in the database operation commands;
   simulating, by the server, based on the set of the write commands of the database operation commands, at least one write command in the data environment by modifying the data environment to generate a result data set;
   generating, by the server, predicted execution results of the database operation commands using a prediction algorithm, the predicted execution results comprising an execution path of the transaction generated based on the result data set;
   transmitting, by the server, the predicted execution results to the application server;
   recording, by the server, the database operation commands and predicted execution data generated from the executing of the prediction to a local storage device;
   receiving, by the server, a transaction commit command from the application server; and
   executing, by the server, the transaction at a database using the database operations commands and predicted execution data stored in the local storage device.

2. The method of claim 1, wherein the receiving database operation commands associated with a transaction executed by an application server comprising intercepting the database operation commands sent by the application server to the database.

3. The method of claim 1, further comprising splitting, by the server, the database operation commands into read commands and write commands.

4. The method of claim 3, the populating a data environment required for the database operation commands comprising:
   executing, by the server, a read command in the database to acquire a read data set in the data environment; and
   storing, by the server, the read data set into the local memory bank to simulate the data environment for the database operation commands.

5. The method of claim 1, the executing the transaction at a database using the database operations commands and predicted execution data stored in the local storage device comprising:
   issuing, by the server to the database, the database operation commands in the local memory bank to the database for execution by the database; and
   receiving, by the server, actual execution results of the database operation commands returned by the database.

6. The method of claim 5, further comprising:
   if the actual execution results are the same as the predicted execution results, issuing the transaction commit command to the database; and
   if the actual execution results are different from the predicted execution results, issuing a transaction rollback command to the database.

7. The method of claim 5, the issuing database operation commands in the local memory bank to the database for execution by the database comprising issuing, by the server, the locally recorded database operation commands at the same time to the database.

8. The method of claim 1, the executing the transaction at a database using the database operations commands and predicted execution data stored in the local storage device comprising:
   determining, by the server, whether the transaction is a stand-alone transaction based on the database operation commands recorded in the local storage device;
   if the transaction is a stand-alone transaction, using, by the server, stand-alone transaction processing logic to control the database to actually execute the transaction of the database operation commands recorded in the local storage device and the predicted execution data; and if the transaction is not a stand-alone transaction, using, by the server, distributed transaction processing logic to control the database to actually execute the transaction of the database operation commands recorded in the local storage device and the predicted execution data.

9. The method of claim 1, further comprising:
deleting, by the server, the database operation commands recorded in the local storage device and the predicted execution data when acquiring a transaction rollback command regarding the transaction.

10. A device comprising:
a processor; and
a storage medium for tangibly storing thereon program logic for execution by the processor, the stored program logic comprising:
  logic, executed by the processor, for intercepting database operation commands associated with a transaction executed by an application server,
  logic, executed by the processor, for splitting the database operation commands into a set of read commands and a set of write commands;
  logic, executed by the processor, for populating a data environment required for the database operation commands in a local memory bank by reading a portion of a database into the local memory bank, the portion identified based on the set of read commands included in the database operation commands,
  logic, executed by the processor, for simulating based on the set of the write commands of the database operation commands, at least one write command in the data environment by modifying the data environment to generate a result data set,
  logic, executed by the processor, for generating predicted execution results of the database operation commands using a prediction algorithm, the predicted execution results comprising an execution path of the transaction generated based on the result data set,
  logic, executed by the processor, for transmitting the predicted execution results to the application server,
  logic, executed by the processor, for recording the database operation commands and predicted execution data generated from the executing of the prediction to a local storage device,
  logic, executed by the processor, for receiving a transaction commit command from the application server, and
  logic, executed by the processor, for executing the transaction at a database using the database operations commands and predicted execution data stored in the local storage device.

11. The device of claim 10, wherein the logic for receiving database operation commands associated with a transaction executed by an application server comprising logic, executed by the processor, for intercepting the database operation commands sent by the application server to the database.

12. The device of claim 10, further comprising logic for splitting the database operation commands into read commands and write commands.

13. The device of claim 12, the logic for populating a data environment required for the database operation commands comprising:
  logic, executed by the processor, for executing a read command in the database to acquire a read data set in the data environment; and
  logic, executed by the processor, for storing the read data set into the local memory bank to simulate the data environment for the database operation commands.

14. The device of claim 10, the logic for executing the transaction at a database using the database operations commands and predicted execution data stored in the local storage device comprising:
  logic, executed by the processor, for issuing, to the database, issuing the database operation commands in the local memory bank to the database for execution by the database; and
  logic, executed by the processor, for receiving actual execution results of the database operation commands returned by the database.

15. The device of claim 14, further comprising:
  logic, executed by the processor, for issuing the transaction commit command to the database if the actual execution results are the same as the predicted execution results; and
  logic, executed by the processor, for issuing a transaction rollback command to the database if the actual execution results are different from the predicted execution results.

16. The device of claim 14, the logic for issuing database operation commands in the local memory bank to the database for execution by the database comprising logic, executed by the processor, for issuing the locally recorded database operation commands at the same time to the database.

17. The device of claim 10, the logic for executing the transaction at a database using the database operations commands and predicted execution data stored in the local storage device comprising:
  logic, executed by the processor, for determining whether the transaction is a stand-alone transaction based on the database operation commands recorded in the local storage device;
  logic, executed by the processor, for, if the transaction is a stand-alone transaction, using stand-alone transaction processing logic to control the database to actually execute the transaction of the database operation commands recorded in the local storage device and the predicted execution data; and
  logic, executed by the processor, for, if the transaction is not a stand-alone transaction, using distributed transaction processing logic to control the database to actually execute the transaction of the database operation commands recorded in the local storage device and the predicted execution data.

18. The device of claim 10, further comprising:
  logic, executed by the processor, for deleting the database operation commands recorded in the local storage device and the predicted execution data when acquiring a transaction rollback command regarding the transaction.

* * * * *